United States Patent
Shukla et al.

(10) Patent No.: US 9,031,072 B2
(45) Date of Patent: May 12, 2015

(54) METHODS AND APPARATUS TO ROUTE FIBRE CHANNEL FRAMES USING REDUCED FORWARDING STATE ON AN FCOE-TO-FC GATEWAY

(75) Inventors: Amit Shukla, Sunnyvale, CA (US); Suresh Boddapati, Union City, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 761 days.

(21) Appl. No.: 12/976,212

(22) Filed: Dec. 22, 2010

(65) Prior Publication Data

US 2012/0163376 A1    Jun. 28, 2012

(51) Int. Cl.
H04L 12/28 (2006.01)
H04L 12/66 (2006.01)
H04L 12/413 (2006.01)
H04L 12/46 (2006.01)
H04L 12/721 (2013.01)
H04L 12/743 (2013.01)
H04L 12/931 (2013.01)
H04L 29/12 (2006.01)
H04L 29/06 (2006.01)

(52) U.S. Cl.
CPC .............. *H04L 12/66* (2013.01); *H04L 12/413* (2013.01); *H04L 12/4641* (2013.01); *H04L 45/66* (2013.01); *H04L 45/7457* (2013.01); *H04L 49/357* (2013.01); *H04L 61/6045* (2013.01); *H04L 63/0236* (2013.01)

(58) Field of Classification Search
None
See application file for complete search history.

(56) References Cited

U.S. PATENT DOCUMENTS

| | | | | |
|---|---|---|---|---|
| 5,970,066 A * | 10/1999 | Lowry et al. | | 370/353 |
| 6,556,541 B1 * | 4/2003 | Bare | | 370/235 |
| 7,430,164 B2 * | 9/2008 | Bare | | 370/217 |
| 7,564,869 B2 * | 7/2009 | Cafiero et al. | | 370/466 |
| 7,924,805 B2 * | 4/2011 | Nishibayashi et al. | | 370/346 |
| 8,018,943 B1 * | 9/2011 | Pleshek et al. | | 370/392 |
| 8,098,677 B1 * | 1/2012 | Pleshek et al. | | 370/419 |
| 8,160,094 B2 * | 4/2012 | Cafiero et al. | | 370/466 |
| 8,238,347 B2 * | 8/2012 | DeSanti et al. | | 370/395.5 |
| 8,248,930 B2 * | 8/2012 | Felderman et al. | | 370/230 |
| 8,284,785 B2 * | 10/2012 | Hirata | | 370/400 |
| 8,307,153 B2 * | 11/2012 | Kishore | | 711/108 |
| 8,321,908 B2 * | 11/2012 | Gai et al. | | 726/1 |
| 8,351,442 B1 * | 1/2013 | McGlaughlin | | 370/401 |
| 8,369,347 B2 * | 2/2013 | Xiong et al. | | 370/401 |
| 8,391,300 B1 | 3/2013 | Dropps et al. | | |
| 8,422,359 B2 * | 4/2013 | Nakajima | | 370/217 |
| 2002/0038339 A1 * | 3/2002 | Xu | | 709/203 |
| 2002/0163884 A1 | 11/2002 | Peles et al. | | |
| 2003/0142685 A1 * | 7/2003 | Bare | | 370/410 |
| 2003/0179707 A1 * | 9/2003 | Bare | | 370/235 |
| 2003/0217319 A1 * | 11/2003 | Tripathi et al. | | 714/751 |
| 2003/0223413 A1 | 12/2003 | Guerrero | | |
| 2004/0103275 A1 * | 5/2004 | Ji et al. | | 713/150 |
| 2005/0125692 A1 * | 6/2005 | Cox et al. | | 713/201 |

(Continued)

*Primary Examiner* — Phirin Sam
*Assistant Examiner* — Faiyazkhan Ghafoerkhan
(74) *Attorney, Agent, or Firm* — Cooley LLP

(57) ABSTRACT

In one embodiment, an apparatus includes a switching policy module configured to define a switching policy associating a Fiber Channel port with a destination Media Access Control (MAC) address. The switching module can be configured to receive a Fiber Channel over Ethernet (FCoE) frame from a network device and send a Fiber Channel frame encapsulated in the FCoE frame to the Fiber Channel port based at least in part on the switching policy and a destination MAC address of the FCoE frame.

17 Claims, 5 Drawing Sheets

(56) References Cited

U.S. PATENT DOCUMENTS

| | | | |
|---|---|---|---|
| 2005/0152305 A1* | 7/2005 | Ji et al. | 370/328 |
| 2005/0165949 A1* | 7/2005 | Teague | 709/236 |
| 2005/0238016 A1* | 10/2005 | Nishibayashi et al. | 370/389 |
| 2006/0098681 A1* | 5/2006 | Cafiero et al. | 370/445 |
| 2006/0146705 A1* | 7/2006 | Waxman | 370/230 |
| 2006/0203721 A1* | 9/2006 | Hsieh et al. | 370/229 |
| 2006/0251067 A1* | 11/2006 | DeSanti et al. | 370/389 |
| 2007/0097927 A1* | 5/2007 | Gorokhov et al. | 370/335 |
| 2008/0056300 A1* | 3/2008 | Williams | 370/466 |
| 2008/0095109 A1* | 4/2008 | Malladi et al. | 370/330 |
| 2008/0232338 A1* | 9/2008 | Ji et al. | 370/338 |
| 2009/0003361 A1* | 1/2009 | Bakthavathsalam | 370/401 |
| 2009/0037977 A1* | 2/2009 | Gai et al. | 726/1 |
| 2009/0041046 A1* | 2/2009 | Hirata | 370/402 |
| 2009/0052345 A1* | 2/2009 | Brown et al. | 370/254 |
| 2009/0052346 A1* | 2/2009 | Brown et al. | 370/254 |
| 2009/0052461 A1* | 2/2009 | Brown et al. | 370/401 |
| 2009/0245791 A1* | 10/2009 | Thaler et al. | 398/45 |
| 2009/0252181 A1* | 10/2009 | Desanti | 370/474 |
| 2009/0254677 A1* | 10/2009 | Desanti | 709/242 |
| 2009/0268612 A1* | 10/2009 | Felderman et al. | 370/230 |
| 2009/0296726 A1* | 12/2009 | Snively et al. | 370/401 |
| 2010/0017497 A1* | 1/2010 | Brown et al. | 709/217 |
| 2010/0115132 A1 | 5/2010 | Hirata et al. | |
| 2010/0165994 A1* | 7/2010 | Narayanaswamy et al. | 370/395.53 |
| 2010/0183024 A1* | 7/2010 | Gupta | 370/463 |
| 2010/0214950 A1* | 8/2010 | Vobbilisetty | 370/254 |
| 2010/0232419 A1* | 9/2010 | Rivers | 370/352 |
| 2011/0022691 A1* | 1/2011 | Banerjee et al. | 709/221 |
| 2011/0044344 A1* | 2/2011 | Hudson et al. | 370/395.53 |
| 2011/0051733 A1* | 3/2011 | Hirata | 370/400 |
| 2011/0064086 A1* | 3/2011 | Xiong et al. | 370/401 |
| 2011/0110241 A1* | 5/2011 | Atkinson et al. | 370/242 |
| 2011/0135303 A1* | 6/2011 | Hufferd | 398/45 |
| 2011/0255540 A1* | 10/2011 | Mizrahi et al. | 370/392 |
| 2011/0280255 A1 | 11/2011 | DeSanti | |
| 2011/0299413 A1* | 12/2011 | Chatwani et al. | 370/252 |
| 2012/0134672 A1* | 5/2012 | Banerjee | 398/45 |
| 2012/0163395 A1* | 6/2012 | Shukla et al. | 370/409 |

* cited by examiner

METHODS AND APPARATUS TO ROUTE FIBRE CHANNEL FRAMES USING REDUCED FORWARDING STATE ON AN FCOE-TO-FC GATEWAY

CROSS-REFERENCE TO RELATED APPLICATIONS

This application is related to U.S. patent application Ser. No. 12/976,208, entitled "Methods and Apparatus to Reduce Forwarding State on an FCoE-to-FC Gateway Using Port-specific MAC Addresses," filed on Dec. 22, 2010, the disclosure of which is incorporated herein by reference in its entirety.

BACKGROUND

Some embodiments described herein relate generally to network routing, and more particularly to routing policies and filters for improved Fibre Channel over Ethernet (FCoE) network routing.

Many modern networks include hardware devices and/or software (executing in hardware) configured to transfer data frames according to one or both of the Ethernet and Fibre Channel networking standards. To allow for interoperability between Ethernet and Fibre Channel resources, these networks often employ a third network protocol known as Fibre Channel over Ethernet ("FCoE"). By encapsulating Fibre Channel frames within an FCoE frame, a network device such as an FCoE-to-Fibre Channel gateway ("FCoE gateway") can route and/or switch Fibre Channel frames from one Fibre Channel device to another over an Ethernet network.

FCoE gateways thus are typically capable of: (1) relaying, to a Fibre Channel device (such as a switch), a Fibre Channel frame extracted from within an FCoE frame, and (2) encapsulating a received Fibre Channel frame within an FCoE frame that can be forwarded, via an Ethernet network, to another Fibre Channel device (such as a Fibre Channel peripheral processing device). As part of its routing responsibilities, many FCoE gateways adhere to one or more routing policies, rules or filters that dictate specific routing behavior. Many filters dictate, for example, whether an FCoE gateway should deliver, drop, or re-route a received frame based on the frame's type, format, and/or contents. Some routing policies can dictate other aspects of data-routing behavior, such as a specified delay time, use of a specified communication port for certain data types, etc.

While such filters and/or routing policies allow for more intelligent routing, storage space for these rules is sometimes limited due to scale and cost constraints. More particularly, when an FCoE gateway assigns a distinct switching policy, guideline or rule for each pairing of a virtual port of a peripheral device and an outbound port of the FCoE gateway (to enable data transmission from the virtual port to a switch), the presence of a switching policy, guideline or rule for each virtual port/outbound port pair can result in an inefficient use of storage space.

Thus, a need exists for methods and apparatus to minimize the number of routing policies required to route and/or switch FCoE frames from peripheral processing devices to Fibre Channel switches, and thereby reduce storage space concerns. A need further exists for methods and apparatus to receive an FCoE frame including a destination Media Access Control (MAC) address associated with peripheral device and an outbound port and forward the FCoE frame (and/or a Fibre Channel frame encapsulated therein) to a Fibre Channel switch via the outbound port, thereby reducing the number of routing policies necessary to route and/or switch FCoE frames (and/or the contents thereof) from a given peripheral processing device to a Fibre Channel switch. A need further exists for methods and apparatus to define a mapping between a virtual Fibre Channel N port and an outbound (egress) port instantiated at an FCoE gateway.

SUMMARY

In one embodiment, an apparatus includes a switching policy module configured to define a switching policy associating a Fibre Channel port with a destination Media Access Control (MAC) address. The switching module can be configured to receive a Fibre Channel over Ethernet (FCoE) frame from a network device and send a Fibre Channel frame encapsulated in the FCoE frame to the Fibre Channel port based at least in part on the switching policy and a destination MAC address of the FCoE frame.

DETAILED DESCRIPTION

In some embodiments, an FCoE-to-Fibre Channel gateway ("FCoE gateway") can be coupled to one or more Fibre Channel peripheral processing devices via one or more Ethernet ports and/or a network. The FCoE gateway can also be coupled to a Fibre Channel switch via one or more Fibre Channel ports of the FCoE gateway. The Fibre Channel switch can include one or more virtual Fibre Channel F ports, and can be further operatively and/or physically coupled to a Fibre Channel network. Each of the peripheral processing devices can be physically and/or operatively coupled to the FCoE gateway via one or more Ethernet ports and/or a network. Any or all of the peripheral processing devices can include one or more virtual Fibre Channel N ports, each virtual Fibre Channel N port being uniquely and operatively coupled to a distinct virtual Fibre Channel F port instantiated at the Fibre Channel switch.

The FCoE gateway can receive an FCoE frame from one of the virtual Fibre Channel N ports instantiated at one of the Fibre Channel peripheral processing devices. The FCoE frame can be received by the FCoE gateway at a physical Ethernet port. The FCoE gateway can identify one or more routing policies stored at the FCoE gateway that are applicable to the received FCoE frame. Based on the one or more applicable routing policies, the FCoE gateway can perform a table lookup using a destination MAC address included in the FCoE frame. The FCoE gateway can perform the lookup on, for example, a forwarding table and/or routing table. The FCoE gateway can next identify an outbound port (e.g., an outbound Fibre Channel port, an outbound FCoE port, or an outbound Ethernet port) associated with the destination MAC address based on the table lookup. In some embodiments, the FCoE gateway can extract or decapsulate a Fibre Channel frame included in the FCoE frame. The FCoE gateway can next send the FCoE frame and/or the Fibre Channel frame to the identified Fibre Channel port. The identified Fibre Channel port can optionally then send, to a compatible device, the FCoE frame and/or the Fibre Channel frame. The compatible device can be, for example, a Fibre Channel switch having one or more ingress Ethernet ports, ingress FCoE ports and/or ingress Fibre Channel ports. In some embodiments, the compatible device can be one or more devices, each configured to receive FCoE frames and/or Fibre Channel frames from the selected outbound port of the FCoE gateway.

Figure 1:
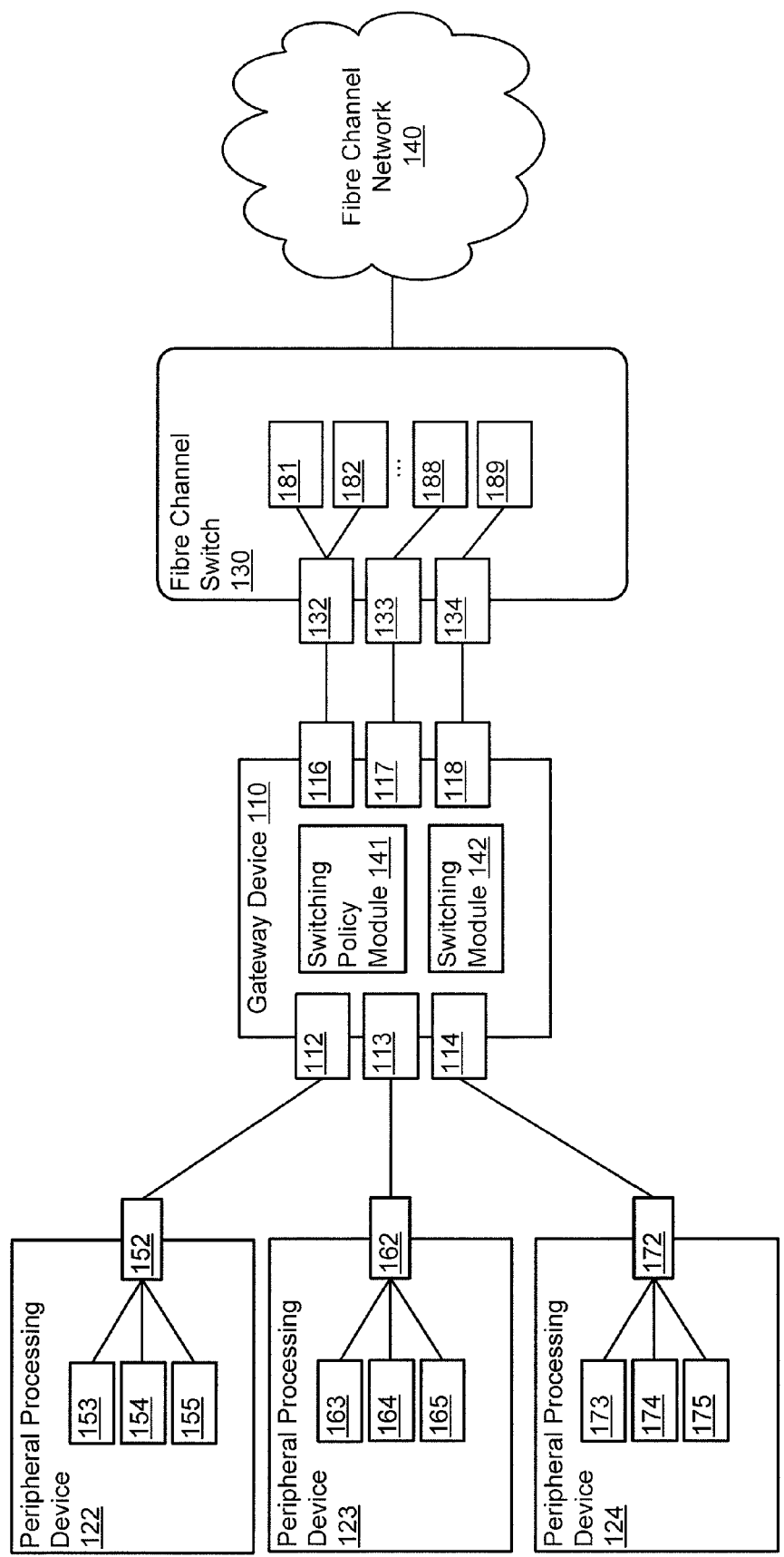
FIG. 1 is a schematic illustration of a mixed Ethernet and Fibre Channel portion of a network, according to an embodiment.

FIG. 1 is a schematic illustration of a mixed Ethernet and Fibre Channel portion of a network, according to an embodiment. More specifically, FIG. 1 illustrates a Network Portion 100 that includes a Gateway Device 110 physically and/or operatively coupled to Peripheral Processing Devices 122-124 (via Ethernet Ports 112-114) and a Fibre Channel Switch 130 (via Fibre Channel Ports 116-118). The Fibre Channel Switch 130 is operatively and/or physically coupled to the Gateway Device 110 via the Fibre Channel Ports 132-134 and to a Fibre Channel Network 140. The Fibre Channel Switch 130 includes a set of Virtual Fibre Channel F Ports 181-189, and each of the Virtual Fibre Channel F Ports 181-189 is operatively coupled to at least one of the Fibre Channel Ports 132-134. The Peripheral Processing Devices 122-124 are operatively and/or physically coupled to the Gateway Device 110 via the FCoE Ports 152, 162 and 172, respectively. The FCoE Ports 152, 162 and 172 are operatively coupled to the Virtual Fibre Channel N Ports 153-155, 163-165 and 173-175, respectively. Each of the Virtual Fibre Channel N Ports 153-155, 163-165 and 173-175 is uniquely and operatively coupled to one of the Virtual Fibre Channel F Ports 181-189 instantiated at the Fibre Channel Switch 130.

The Network Portion 100 can include a combination of hardware and/or software (executing on hardware) configured to transmit data between any of the Peripheral Processing Devices 122-124 and the Fibre Channel Switch 130 and/or the Fibre Channel Network 140 via the Gateway Device 110. The Network Portion 100 can be, for example, a portion of a data center fabric, local area network (LAN), wide area network (WAN), storage area network (SAN), intranet, or the Internet.

The Gateway Device 110 can be, for example, an FCoE gateway. In some embodiments, the Gateway Device 110 can be configured to transmit data based at least in part on the Ethernet, Fibre Channel and/or FCoE network protocols via the Ethernet Ports 112-114 and/or the Fibre Channel Ports 116-118. In such embodiments, the Ethernet Ports 112-114 can be configured to send FCoE frames to and/or receive FCoE frames from the FCoE Ports 152, 162 and 172, respectively. In such embodiments, the Fibre Channel Ports 116-118 can be Fibre Channel ports configured to send Fibre Channel frames to and/or receive Fibre Channel frames from the Fibre Channel Switch 130. Although not shown in FIG. 1, in some embodiments, the Gateway Device 110 can be physically and/or operatively coupled to one or more Fibre Channel switches, similar to the Fiber Channel Switch 130. In some embodiments, the Gateway Device 110 can be physically and/or operatively coupled to one or more of the Peripheral Processing Devices 122-124 via a network, such as an Ethernet network.

As shown in FIG. 1, the Gateway Device 110 also includes a Switching Policy Module 141 and a Switching Module 142. The Switching Policy Module 141 can be any combination of hardware and/or software (executing in hardware) configured to store one or more routing policies, guidelines or rules. The one or more routing policies, guidelines or rules can indicate, allow and/or direct how network traffic should be handled, routed, switched and/or forwarded by the Gateway Device 110. For example, a switching policy, guideline or rule can indicate, allow and/or direct that any received data packet and/or frame failing to comply with one or more formatting rules, guidelines or policies should be dropped (i.e., not forwarded by the Gateway Device 110 to any other network device). Another switching policy, guideline or rule can indicate, allow and/or direct a desired schedule or timing for the forwarding of certain network traffic. In some embodiments, a switching policy, guideline or rule can direct the Switching Module 142 (described below) to forward all received data packets and/or frames that include a particular destination MAC address to a specific Fibre Channel port from the Fibre Channel Ports 116-118.

The Switching Module 142 can be any combination of hardware and/or software (executing in hardware) configured to direct and/or forward one or more data packets and/or frames received at the Gateway Device 110. In some embodiments, the Switching Module 142 can send one or more FCoE frames according to one or more routing policies defined by the Switching Policy Module 141. For example, the Switching Module 142 can forward a received FCoE frame to the Fibre Channel Port 117 based on a switching policy, guideline or rule defined by the Switching Policy Module 141. In this example, the Fibre Channel Port 117 can next send the FCoE frame and/or a Fibre Channel frame encapsulated in the FCoE frame to the Fibre Channel Switch 130 for further handling.

In some embodiments, each of the Ethernet Ports 112-114 can be a physical Ethernet port configured to exchange data with one of the Peripheral Processing Devices 122, 123 and 124, respectively via the FCoE Ports 152, 162 and 172, respectively. In some embodiments, one or more of the Ethernet Ports 112-114 can be configured to exchange data with any of the FCoE Ports 152, 162 and 172 via an Ethernet network, such as a local area network (LAN) and/or wide area network (WAN) (not shown in FIG. 1). Although not shown in FIG. 1, in some embodiments, each of the Ethernet Ports 112-114 can be physically coupled to one of multiple Ethernet Network Interface Cards (NICs) included in the Gateway Device 110.

As shown in FIG. 1, each of the Fibre Channel Ports 116-118 is uniquely coupled to one of the Fibre Channel Ports 132-134 of the Fibre Channel Switch 130. Although not shown in FIG. 1, in some embodiments, each of the Fibre Channel Ports 116-118 can be coupled to one or more of the Fibre Channel Ports 132-134 of the Fibre Channel Switch 130. In some embodiments, each of the Fibre Channel Ports 116-118 can be a physical Fibre Channel F port configured to allow exchange of one or more Fibre Channel frames between the Gateway Device 110 and the Fibre Channel Switch 130.

Accordingly, the Gateway Device 110 can serve as a gateway between the Peripheral Processing Devices 122-124 and the Fibre Channel Switch 130, allowing for the transmission of FCoE frames (and/or Fibre Channel frames encapsulated in such FCoE frames) from the Peripheral Processing Devices 122-124 to the Fibre Channel Switch 130, and for the transmission of Fibre Channel frames from the Fibre Channel Switch 130 to any of the Peripheral Processing Devices 122-124.

Each of the Peripheral Processing Devices 122-124 can be any combination of hardware and/or software (executing in hardware) capable of transmitting information to and/or receiving information from the Gateway Device 110. In some embodiments, one or more of the above-described peripheral processing devices can be a server device, an application server, a database system, a storage device, gateway, workstation, a compute device and/or the like. Each of the Peripheral Processing Devices 122-124 can optionally be, for example, compute nodes, service nodes, routers, and/or storage nodes. In some embodiments, one or more of the Peripheral Processing Devices 122-124 can perform one or more computing tasks, such as one or more data storage, Software as a Service (SAS), web service, content request, or other computing tasks. In some embodiments, one or more of the Peripheral Processing Devices 122-124 can be a Fibre Channel-based device operatively and/or physically coupled to one or more other Fibre Channel-based devices, such as a Fibre Channel switch, a Fibre Channel fabric, a SAN, etc.

As shown in FIG. 1, the Peripheral Processing Devices 122-124 can include the FCoE Ports 152, 162 and 172, respectively, and the Virtual Fibre Channel N Ports 153-155, 163-165 and 173-175, respectively. In some embodiments, each of the Virtual Fibre Channel N Ports 153-155, 163-165 and 173-175 can be configured to send one or more Fibre Channel frames for encapsulation within an FCoE frame and subsequent transmission by the corresponding FCoE port from the FCoE Ports 152, 162 and 172. The appropriate FCoE port from the FCoE Ports 152, 162 and 172 can transmit the FCoE frame to the Gateway Device 110. Each of the Virtual Fibre Channel N Ports 153-155, 163-165 and 173-175 can also be configured to receive one or more Fibre Channel frames that have been extracted and/or decapsulated from one or more FCoE frames, each of the FCoE frames having been received by the corresponding FCoE port from the FCoE Ports 152, 162 and 172.

In some embodiments, the Peripheral Processing Devices 122-124 can be in communication with the Gateway Device 110 via any suitable connection such as, for example, an optical connection (e.g., an optical cable and optical connectors), an electrical connection (e.g., an electrical cable and electrical connectors) and/or the like. Similarly stated, each of the FCoE Ports 152, 162 and 172 can provide a communication interface through which a Peripheral Processing Device 122-124 can be operatively coupled to the Gateway Device 110.

As such, the Peripheral Processing Devices 122-124 are configured to send data (e.g., Ethernet frames, FCoE frames, data frames, data cells, etc.) to and receive data from the Gateway Device 110. In some embodiments, each connection between the Peripheral Processing Devices 122-124 and the Gateway Device 110 is a direct link. In other embodiments, the Peripheral Processing Devices 122-124 can be operatively coupled to the Gateway Device 110 via intermediate modules or devices.

In some embodiments, any combination of the Peripheral Processing Devices 122-124 can be physically located within the same physical chassis as one another and/or another one or more peripheral processing devices. In other embodiments, each of the Peripheral Processing Devices 122-124 can be located within a different chassis.

The FCoE ports 152, 162 and 172 can be physical Ethernet ports capable of sending and/or receiving one or more Ethernet and/or FCoE frames. In some embodiments, each of the FCoE ports 152, 162 and 172 can be associated with and/or located on a physical line card (not shown in FIG. 1), such as an Ethernet NIC. In some embodiments, each of the FCoE ports 152, 162 and 172 can include and/or be associated with a frame formatter module (not shown in FIG. 1) included at each of the Peripheral Processing Device 122-124, respectively. Each such frame formatter module can be configured to encapsulate Fibre Channel frames received from a virtual Fibre Channel N port within FCoE frames for transmission to the Gateway Device 110. In such embodiments, each such frame formatter module can be further configured to decapsulate and/or extract Fibre Channel frames from within FCoE frames received from the Gateway Device 110. In some embodiments, each of the FCoE Ports 152, 162 and 172 can alternatively be physically coupled to a Converged Network Adapter (CNA) included in the Peripheral Processing Devices 122-124, respectively, each such CNA being configured to send and/or receive traditional Ethernet and/or FCoE frames to and/or from the Gateway Device 110. The Virtual Fibre Channel N Ports 153-155, 163-165 and 173-175 can be virtual Fibre Channel N ports similar to those generally associated with Fibre Channel and/or FCoE networks. In some embodiments, one or more of the Virtual Fibre Channel N Ports 153-155, 163-165 and 173-175 can constitute one of two virtual end nodes that define a virtual link. In such embodiments, each such Virtual Fibre Channel N Port can each be operatively coupled to a Virtual Fibre Channel F Port from the Virtual Fibre Channel F Ports 181-189 instantiated at the Fibre Channel Switch 130.

The Fibre Channel Switch 130 can be any combination of hardware and/or software (executing in hardware) configured to perform switching of Fibre Channel frames received from the Gateway Device 110. As shown in FIG. 1, the Fibre Channel Switch 130 is operatively coupled to the Gateway Device 110 and to the Fibre Channel Network 140, and can be configured to perform known switching tasks on Fibre Channel frames received from the Gateway Device 110. As also shown in FIG. 1, the Fibre Channel Switch 130 includes Fibre Channel Ports 132-134, each of which is operatively and/or physically coupled to one of the Fibre Channel Ports 116-118 on the Gateway Device 110. In some embodiments, each of the Fibre Channel Ports 132-134 can be a Fibre Channel port configured to exchange one or more Fibre Channel frames with a single Fibre Channel port from the Fibre Channel Ports 116-118. Alternatively, each of the Fibre Channel Ports 132-134 can be configured to exchange one or more Fibre Channel and/or FCoE frames with one or more ports of the Gateway Device 110, such as one or more of the Fibre Channel Ports 116-118. The Fibre Channel Switch 130 also includes the Virtual Fibre Channel F Ports 181-189. In some embodiments, each of the Virtual Fibre Channel F Ports 181-189 can be operatively coupled to one of the Virtual Fibre Channel N Ports 153-155, 163-165 and 173-175 instantiated at the Peripheral Processing Devices 122, 123 and 124, respectively. In such embodiments, each of the Virtual Fibre Channel F Ports 181-189 can exchange Fibre Channel frames with a single virtual Fibre Channel N port from the Virtual Fibre Channel N Ports 153-155, 163-165 and 173-175, thus defining a virtual link between those two virtual Fibre Channel ports.

The Virtual Fibre Channel F Ports 181-189 can be virtual Fibre Channel F ports similar to those generally associated with Fibre Channel and/or FCoE networks. In some embodiments, one or more of the Virtual Fibre Channel F Ports 181-189 can constitute one of two virtual end nodes that define a virtual link. For example, as described above, each such Virtual Fibre Channel F Port can be operatively uniquely associated with a Virtual Fibre Channel N Port from the Virtual Fibre Channel N Ports 153-155, 163-165 and 173-175, thus defining a virtual link.

In some embodiments, the Fibre Channel Switch 130 can comprise multiple physical devices. In some embodiments, the Fibre Channel Switch 130 can be or include a Fibre Channel Switch Fabric, such as a multi-stage Fibre Channel fabric. In such embodiments, the Fibre Channel Switch 130 can be included in, for example, a data center, and can be define one or more logical hierarchical elements, such as virtual data center fabrics (VDCFs) and/or virtual local area networks (VLANs).

The Fibre Channel Network 140 can be any combination of hardware devices and/or software modules (executing in hardware) that together comprise a Fibre Channel network. For example, although not shown in FIG. 1, the Fibre Channel Network 140 can include one or more Fibre Channel-compatible servers and/or peripheral devices connected to one or more Fibre Channel switching devices including one or more Host Bus Adapters (HBAs). In some embodiments, the Fibre Channel Network 140 can include one or more subnetwork portions, such as one or more Fibre Channel zones and/or storage area networks (SANs). As shown in FIG. 1, the Fibre Channel Network 140 can be operatively coupled to the Peripheral Processing Devices 122-124 via the Gateway Device 110 and the Fibre Channel Switch 130. In such embodiments, the Fibre Channel Network 140 can thus exchange data with the Peripheral Processing Devices 122-124.

Figure 2:
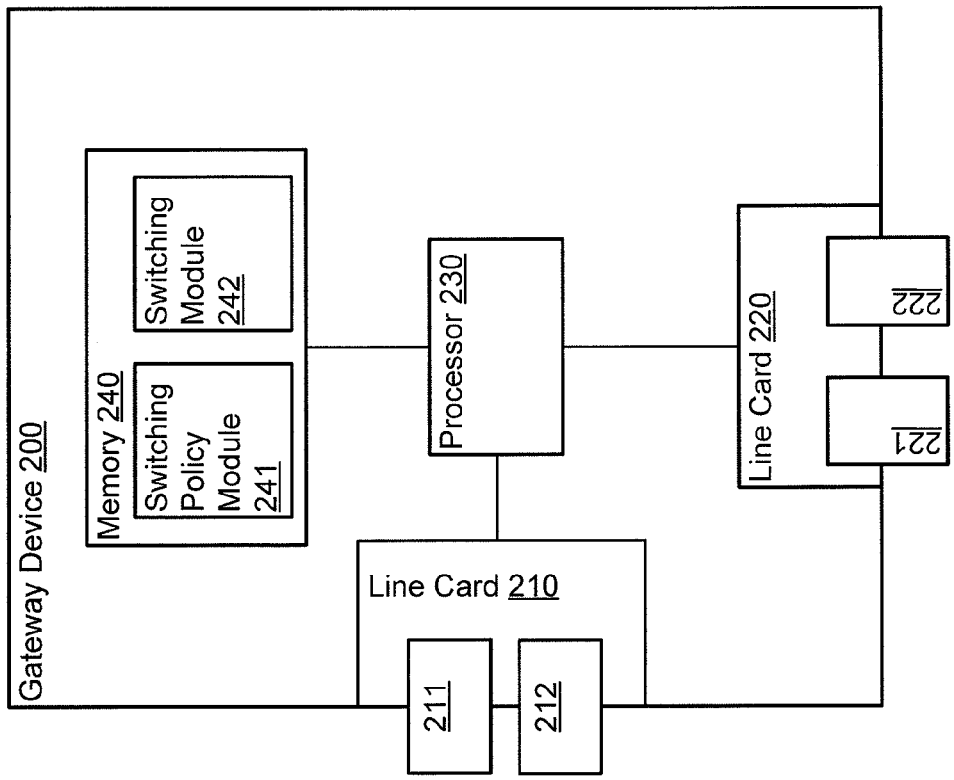
FIG. 2 is a schematic illustration of a gateway device of a mixed Fibre Channel/Ethernet network portion, according to another embodiment.

FIG. 2 is a schematic illustration of a gateway device of a mixed Fibre Channel/Ethernet network portion, according to another embodiment. More specifically, FIG. 2 is a system block diagram of a Gateway Device 200, similar to the Gateway Device 110 described in connection with FIG. 1 above. The Gateway Device 200 includes a Processor 230, a Memory 240, a Line Card 210 and a Line Card 220. The Memory 240 includes an Policy Module 241 and a Switching Module 242. The Line Card 210 includes the Physical Ports 211 and 212, and the Line Card 220 includes the Physical Ports 221 and 222. The Processor 230 is operatively coupled to the Memory 240, the Line Card 210 and the Line Card 220. In some embodiments, the Line Cards 210 and/or 220 include one or more processors and/or memories (not shown in FIG. 2).

Similar to the Ethernet Ports 112-114 of the Gateway Device 110 (shown in FIG. 1), the Physical Ports 211-212 and 221-222 can be configured to communicate with Ethernet and/or Fibre Channel peripheral processing devices, optionally via an Ethernet Network. Additionally or alternatively, similar to the Fibre Channel Ports 116-118 (shown in FIG. 1), the Physical Ports 211-222 and 221-222 can be configured to communicate with Fibre Channel devices, such as Fibre Channel switches. For example, the Physical Ports 211-212 and 221-222 can implement a physical layer using twisted-pair electrical signaling via electrical cables or fiber-optic signaling via fiber-optic cables. In some embodiments, some of the Physical Ports 211-212 and 221-222 can implement one physical layer such as twisted-pair electrical signaling, and others of the Physical Ports 211-212 and 221-222 can implement a different physical layer, such as fiber-optic signaling. Furthermore, the Physical Ports 211-212 and 221-222 can be configured to allow the Gateway Device 200 to communicate with peripheral processing devices and/or switching devices via a common protocol such as Ethernet, Fibre Channel and/or FCoE. In some embodiments, some of the Physical Ports 211-212 and 221-222 can implement one protocol such as Ethernet/FCoE and others of the Physical Ports 211-212 and 221-222 can implement a different protocol such as Fibre Channel. Thus, the Gateway Device 200 can be in communication with multiple peripheral processing and/or switching devices using homogeneous or heterogeneous physical layers and/or protocols via the Physical Ports 211-212 and 221-222.

In some embodiments, the Gateway Device 200 can be configured to forward an FCoE frame to a Fibre Channel Switch based on one or more routing policies, guidelines or rules. For example, the Policy Module 241 stored at the Memory 240 can be configured to store one or more routing policies and/or forwarding tables for reference by the Switching Module 242 when preparing a data packet and/or frame for outbound transmission. The one or more routing policies, guidelines or rules can indicate, allow and/or direct, for example, that all data frames received from a particular logical or physical address should be sent to a device or module having a specified logical or physical address. Alternatively, the one or more routing policies can specify that all data frames of a particular type (such as FCoE, Ethernet, or Fibre Channel) be sent via one of a specified set of ports (such as one of the Fibre Channel Ports 116-118 shown in FIG. 1).

In some embodiments, the Gateway Device 200 can also be configured to prepare a data frame or packet (e.g., an Ethernet or FCoE frame and/or packet) for transmission to a peripheral processing device (e.g., one of the Peripheral Processing Devices 122-124) or a Fibre Channel device (e.g., the Fibre Channel Switch 130). For example, the Gateway Device 200 can be configured to forward, classify, and/or modify the frame encapsulation (e.g., modify, add and/or remove a header portion, footer portion and/or any other identifier included within the data frame) of a data frame prior to sending the data frame to a communications network, such as an Ethernet network. Additionally, the Gateway Device 200 can be configured to partition and/or divide the data frame into data cells (e.g., having fixed length payloads) prior to sending the data cells to the switch fabric. Additional details related to frame and/or packet classification are described in U.S. patent application Ser. No. 12/242,168 entitled "Methods and Apparatus Related to Packet Classification Associated with a Multi-Stage Switch," filed Sep. 30, 2008, and U.S. patent application Ser. No. 12/242,172, entitled "Methods and Apparatus for Packet Classification Based on Policy Vectors," filed Sep. 30, 2008, both of which are incorporated herein by reference in their entireties.

Figure 3:
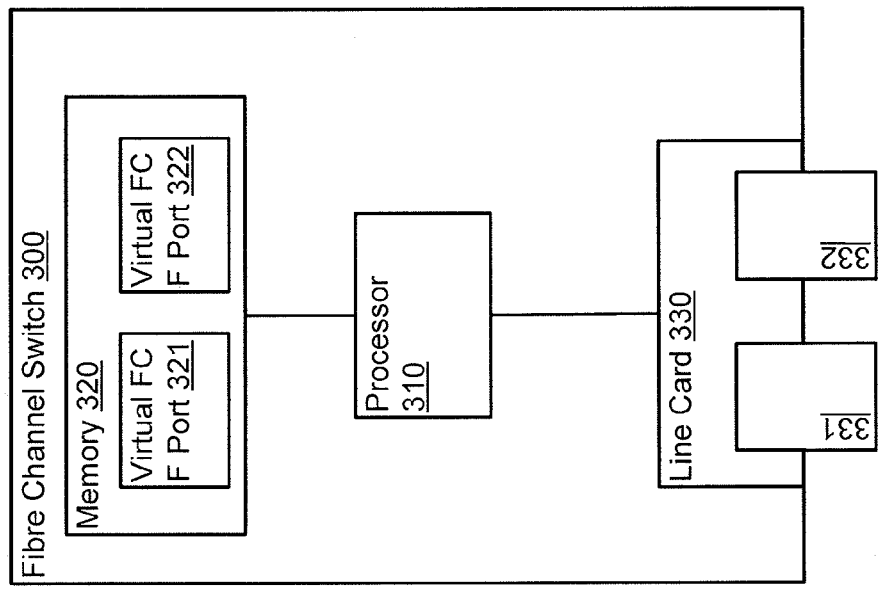
FIG. 3 is a schematic illustration of a Fibre Channel switch of a mixed Fibre Channel/Ethernet network portion, according to another embodiment.

FIG. 3 is a schematic illustration of a Fibre Channel switch, according to another embodiment. More specifically, FIG. 3 is a system block diagram of a Fibre Channel Switch 300 substantially similar to the Fibre Channel Switch 130 described in connection with FIG. 1 above, according to an embodiment. The Fibre Channel Switch 300 includes a Processor 310, a Memory 320, and a Line Card 330. The Line Card 330 includes Fibre Channel Ports 331 and 332. The Processor 310 is operatively coupled to the Memory 320 and the Line Card 330. The Memory 320 includes Virtual Fibre Channel F Port 321 and Virtual Fibre Channel F Port 322. The Fibre Channel Switch 300 can communicate with other Fibre Channel devices, such as an FCoE gateway (similar to the Gateway Device 110 shown in FIG. 1), via the Fibre Channel Ports 331 and 332.

In some embodiments, the Fibre Channel Switch 300 can perform typical network switching functions on Fibre Channel frames. The Fibre Channel Switch 300 can, for example, receive a Fibre Channel frame from a gateway device and direct that Fibre Channel frame to an appropriate next-hop device within a Fibre Channel network to which the Fibre Channel Switch 300 is coupled. In some embodiments, the Fibre Channel Switch 300 can communicate with one or more peripheral processing devices (e.g., one of the Peripheral Processing Devices 122-124) via the Virtual Fibre Channel F Port 321 and/or the Virtual Fibre Channel F Port 322. For example, the Fibre Channel Switch 300 can send a Fibre Channel frame from the Virtual Fibre Channel F Port 321 for ultimate transmission to a virtual Fibre Channel N port instantiated at a peripheral processing device (e.g., the Virtual Fibre Channel N Port 173 instantiated at the Peripheral Processing Device 124 in FIG. 1). In some embodiments, the Fibre Channel Switch 300 can receive an FIP request originally sent from a virtual Fibre Channel N port instantiated at a peripheral processing device and forwarded to the Fibre Channel Switch 300 by a gateway device (e.g., the Gateway Device 110). In such embodiments, the Fibre Channel Switch 300 can define a MAC address and/or an FCID for the virtual Fibre Channel N port, and send a signal including the assigned MAC address and/or FCID to the gateway device for forwarding to the virtual Fibre Channel N port.

Figure 4:
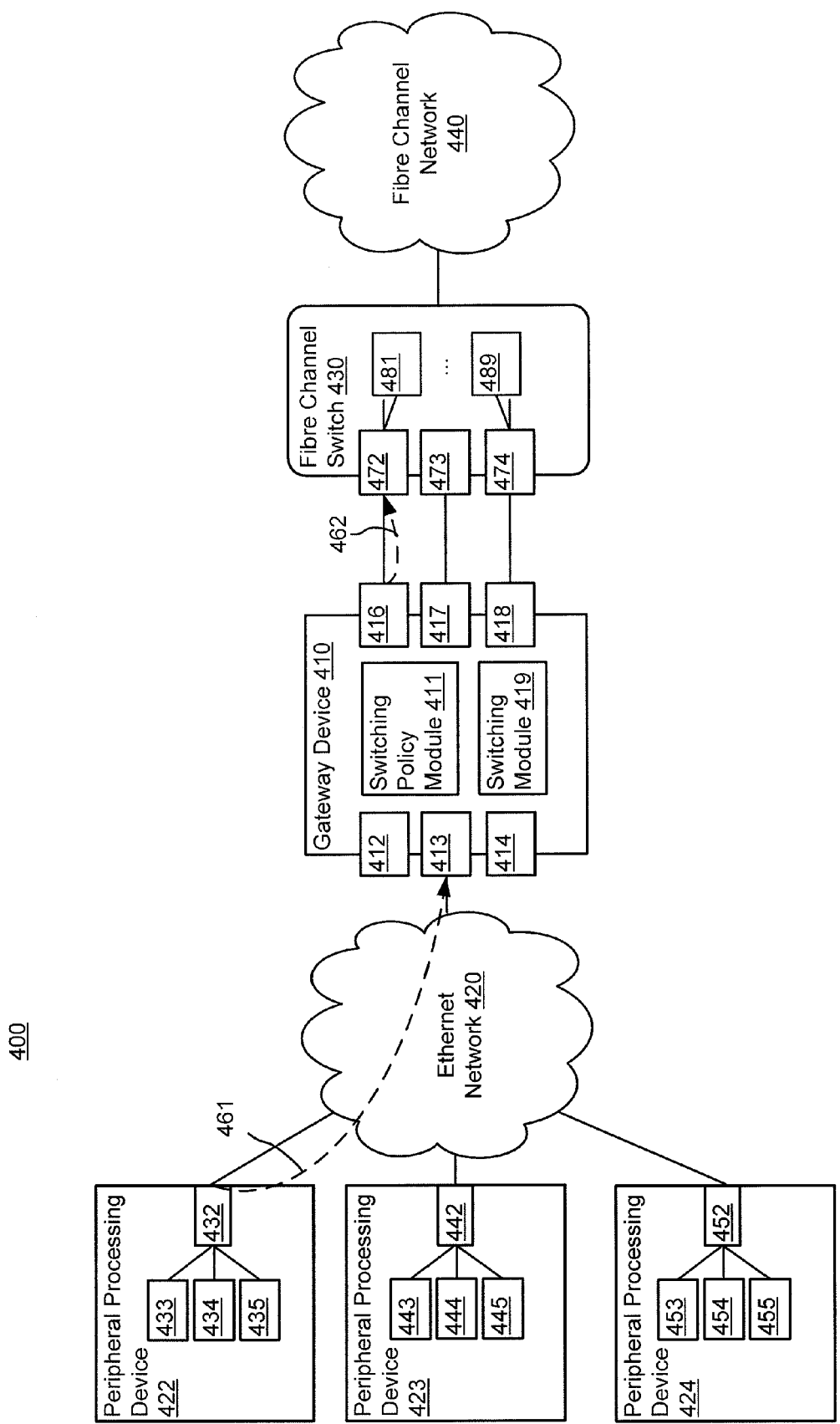
FIG. 4 is a schematic illustration of a mixed Ethernet/Fibre Channel network portion including a gateway device that forwards an FCoE frame to a Fibre Channel switch via a Fibre Channel port based on a switching policy associated with the Fibre Channel port and a destination MAC address included in the FCoE frame, according to an embodiment.

FIG. 4 is a schematic illustration of a mixed Ethernet/Fibre Channel network portion including a gateway device that forwards an FCoE frame to a Fibre Channel switch via a Fibre Channel port based on a switching policy, guideline or rule associated with the Fibre Channel port and a destination MAC address included in the FCoE frame, according to an embodiment.

More specifically, FIG. 4 illustrates a Network Portion 400 that includes a Gateway Device 410 physically and/or operatively coupled to Peripheral Processing Devices 422-424 (via an Ethernet Network 420 and Ethernet Ports 412-414) and a Fibre Channel Switch 430 (via Fibre Channel Ports 416-418). The Gateway Device 410 includes a Switching Module 411 and a Switching Module 419. The Fibre Channel Switch 430 is operatively and/or physically coupled to the Gateway Device 410 via the Fibre Channel Ports 472-474 and to a Fibre Channel Network 440. The Fibre Channel Switch 430 includes a set of Virtual Fibre Channel F Ports 481-489, each of which is operatively and/or physically coupled to at least one of the Fibre Channel Ports 472-474. The Peripheral Processing Devices 422-424 are operatively and/or physically coupled to the Gateway Device 410 via the FCoE Ports 432, 442 and 452, respectively, and the Ethernet Network 420. The FCoE Ports 432, 442 and 452 are operatively coupled to the Virtual Fibre Channel N Ports 433-435, 443-445 and 453-455, respectively. Each of the Virtual Fibre Channel N Ports 433-435, 443-445 and 453-455 is uniquely and operatively coupled to one of the Virtual Fibre Channel F Ports 481-489 instantiated at the Fibre Channel Switch 430. In some embodiments, each of the above-described elements shown in FIG. 4 can be substantially similar to the like-named element(s) shown and described in connection with FIG. 1 above.

The Ethernet Network 420 can be any combination of network hardware devices and/or software modules (executing in hardware) that together comprise an Ethernet network. The Ethernet Network 420 can include, for example, one or more Ethernet-compatible switches, routers, peripheral devices, servers, line cards and/or network interface cards (NICs). In some embodiments, the Ethernet Network 420 can include one or more devices and/or modules physically and/or operatively coupled via cable (such as Category 5 cable) and/or one or more wireless connections.

As shown in FIG. 4, the Ethernet Network 420 is operatively and/or physically coupled to each of the Peripheral Processing Devices 422-424 via the FCoE Ports 452, 462 and 472, respectively. Although not shown in FIG. 4, in some embodiments, any or all of the Peripheral Processing Devices 422-424 can be included in the Ethernet Network 420. In some embodiments, the Ethernet Network 420 can transmit one or more FCoE frames to one or more of the Peripheral Processing Devices 422-424. The one or more FCoE frames (not shown in FIG. 4) can include encapsulated Fibre Channel frames originally sent from the Fibre Channel Switch 430. Additionally, the Ethernet Network 420 can optionally receive one or more FCoE and/or Ethernet frames from any of the Peripheral Processing Devices 422-424 for transmission to the Fibre Channel Switch 430 via the Gateway Device 410.

In some embodiments, one of the FCoE Ports 432, 442 and 452 can receive a Fibre Channel frame from one of the Virtual Fibre Channel N Ports 433-435, 443-445 and 453-455, respectively and send an FCoE frame including the Fibre Channel frame to the Gateway Device 410 via the Ethernet Network 420. For example, as shown in FIG. 4, the FCoE Port 432 of the Peripheral Processing Device 422 can receive a Fibre Channel frame from the Virtual Fibre Channel N Port 433 and send a Signal 461 including an FCoE frame (which includes a Fibre Channel frame) to the Gateway Device 410.

As shown in FIG. 4, the Gateway Device 410 can receive the Signal 461 at the Ethernet Port 413. At this point, the Switching Module 419 can forward the FCoE frame and/or the Fibre Channel frame to the Fibre Channel Port 416 based on one or more routing policies defined by the Switching Policy Module 411. More specifically, the Switching Module 419 can reference and/or query the Switching Policy Module 411 to determine whether any routing policies defined by the Switching Policy Module 411 are applicable to the received FCoE frame and/or the included Fibre Channel frame. In some embodiments, at least one switching policy, guideline or rule defined by the Switching Policy Module 411 can direct or provide instructions or routing information to the Switching Module 419 to forward the FCoE frame and/or the Fibre Channel frame to a specified Fibre Channel port 416-418. For example, at least one switching policy, guideline or rule can indicate, allow and/or direct that the Switching Module 419 should send a given Fibre Channel frame to the Fibre Channel Port 416 when a destination MAC address included in the FCoE frame matches a predetermined destination MAC address associated with the Fibre Channel Port 416. In some embodiments, the switching policy, guideline or rule can be defined based at least in part on a routing and/or forwarding table containing a record that includes (or associates) both the destination MAC address and an identifier of the Fibre Channel Port 416. Additional details related to switching policy consolidation/minimization and the routing of FCoE frames via a Fibre Channel port based on a destination MAC address are described in co-pending U.S. patent application Ser. No. 12/976,208, entitled "Methods and Apparatus to Reduce Forwarding State on an FCoE-to-FC Gateway Using Port-specific MAC Addresses," filed on even date herewith, which is incorporated herein by reference in its entirety.

In some embodiments, the Switching Module 419 can send the Fibre Channel frame to the Fibre Channel Switch 430 via the Fibre Channel Port 416. As shown in FIG. 4, the Fibre Channel Switch 430 can include the Fibre Channel frame in a Signal 462 sent from the Fibre Channel Port 416 of the Gateway Device 410 to the Fibre Channel Port 472 of the Fibre Channel Switch 430. Although not shown in FIG. 4, the Fibre Channel Switch 430 can forward the received Fibre Channel frame to one of the Virtual Fibre Channel F Ports 481-489 based at least in part on a destination identifier ("D ID") included in the Fibre Channel frame. In some embodiments, the Fibre Channel Switch 430 can optionally forward the Fibre Channel frame to the Fibre Channel Network 440 for further handling.

Figure 5:
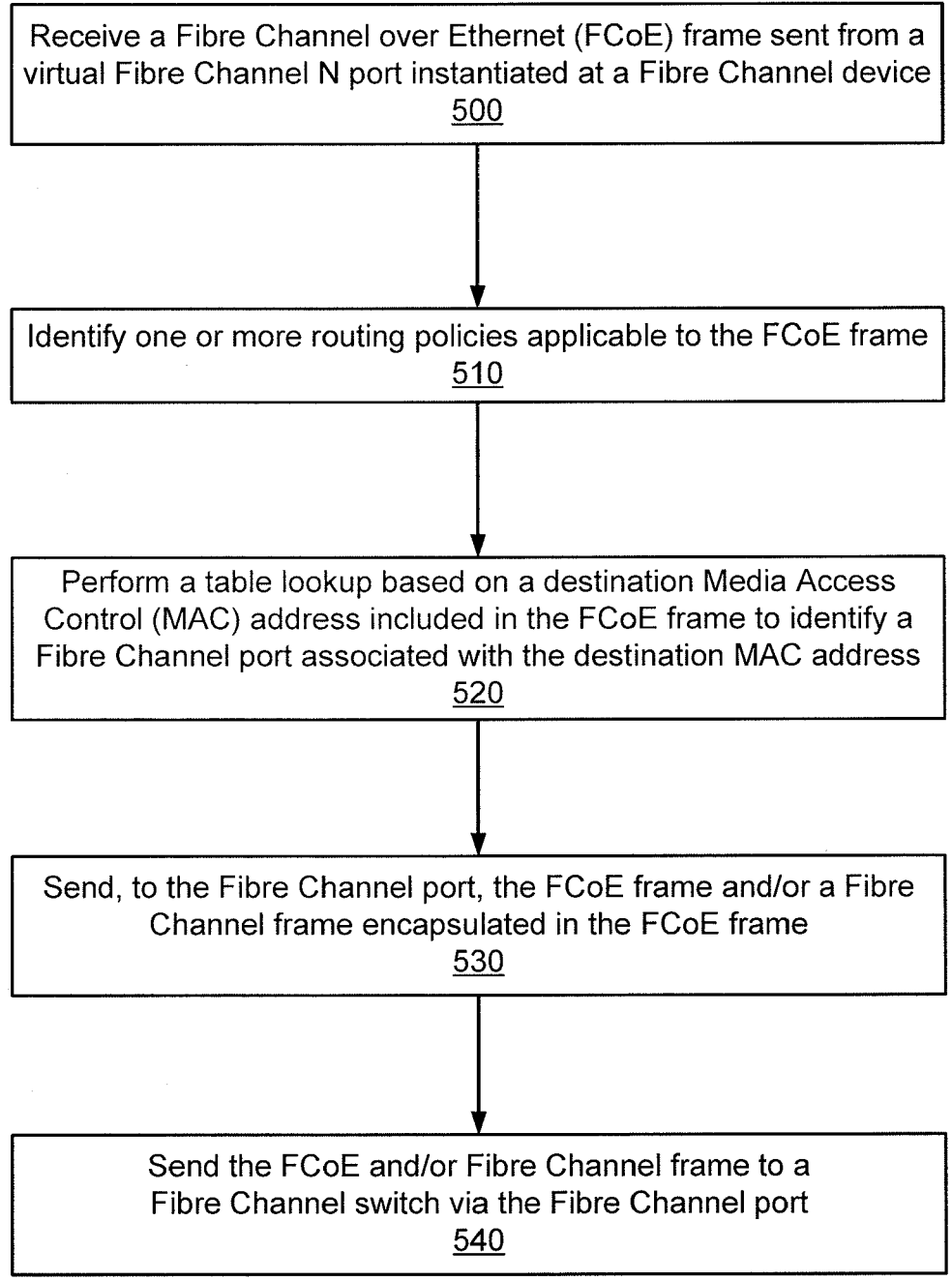
FIG. 5 is a flow chart that illustrates a method of forwarding an FCoE frame to a Fibre Channel switch via a Fibre Channel port based on a destination MAC address included in the FCoE frame, according to another embodiment.

FIG. 5 is a flow chart that illustrates a method of forwarding an FCoE frame (and/or a Fibre Channel frame included in the FCoE frame) to a Fibre Channel port based on a destination MAC address included in the FCoE frame, according to another embodiment.

An FCoE gateway can receive an FCoE frame sent from a virtual Fibre Channel N port instantiated at a Fibre Channel device, 500. In some embodiments, the FCoE gateway can be any gateway device and/or module capable of receiving and sending both FCoE and Fibre Channel frames. In some embodiments, the FCoE gateway can optionally be any hardware-based module and/or software-based module (executing in hardware) configured to receive and/or send both FCoE and Fibre Channel frames. The FCoE gateway can optionally include switching and/or routing functionality and can be similar to the Gateway Device 110 discussed in connection with FIG. 1 above. The Fibre Channel device can be a Fibre Channel peripheral processing device. The virtual Fibre Channel N port can be a virtual Fibre Channel N port (e.g., any of the Virtual Fibre Channel N Ports 153-155, 163-165 and 173-175 discussed in connection with FIG. 1 above).

In some embodiments, the FCoE gateway can receive the FCoE frame from a Fibre Channel peripheral processing device and/or server, optionally via an Ethernet network. The FCoE frame can include a Fibre Channel frame for delivery to a Fibre Channel switch.

The FCoE gateway can identify one or more routing policies applicable to the FCoE frame, 510. Having received the FCoE frame, the FCoE gateway can determine that one or more routing policies apply to the FCoE frame. For example, the FCoE gateway can identify a switching policy, guideline or rule indicating, allowing and/or directing that a Fibre Channel frame encapsulated in the FCoE frame can be forwarded to a specified Fibre Channel port of the FCoE gateway based on a destination MAC address included in the FCoE frame. The FCoE gateway can also, for example, identify a switching policy indicating, allowing and/or directing that all FCoE frames received from a specified peripheral processing device be inspected for malicious content, and/or another switching policy indicating, allowing and/or directing that any FCoE frame including a specified source MAC address be dropped.

The FCoE Gateway can perform a table lookup based on a destination Media Access Control (MAC) address included in the FCoE frame to identify a Fibre Channel port associated with the destination MAC address, 520. When the FCoE gateway identifies a switching policy associated with the FCoE frame indicating, allowing and/or directing that a Fibre Channel frame encapsulated in the FCoE frame can be forwarded to the Fibre Channel switch via a specified Fibre Channel port of the FCoE gateway, the FCoE gateway can identify the applicable Fibre Channel port. To do so, the FCoE gateway can perform a lookup on a forwarding or other table using a destination MAC address included in the FCoE frame. The forwarding or other table can be similar to the Table 600 discussed in connection with FIG. 6 below, and can include a mapping between one or more destination MAC addresses and one or more outbound Fibre Channel ports (e.g., Fibre Channel ports). By referencing the lookup or other table using the destination MAC address, the FCoE gateway can thus identify the Fibre Channel port associated with the destination MAC address.

The FCoE gateway can send, to the identified Fibre Channel port, the FCoE frame and/or a Fibre Channel frame included in the FCoE frame, 530. Having identified a Fibre Channel port on which to send the Fibre Channel frame, the FCoE gateway can extract and/or decapsulate a Fibre Channel frame included in the FCoE frame and prepare the Fibre Channel frame for transmission to the Fibre Channel switch. In some embodiments, the FCoE gateway can send the FCoE frame to the identified Fibre Channel port.

The FCoE gateway can send the FCoE frame and/or extracted Fibre Channel frame to a Fibre Channel switch via the identified Fibre Channel port, 540. Having extracted the Fibre Channel frame from the FCoE frame and identified a Fibre Channel port associated with the destination MAC address included in the FCoE frame, the FCoE gateway can next send and/or forward the Fibre Channel frame to the Fibre Channel switch via the identified Fibre Channel port.

Figure 6:
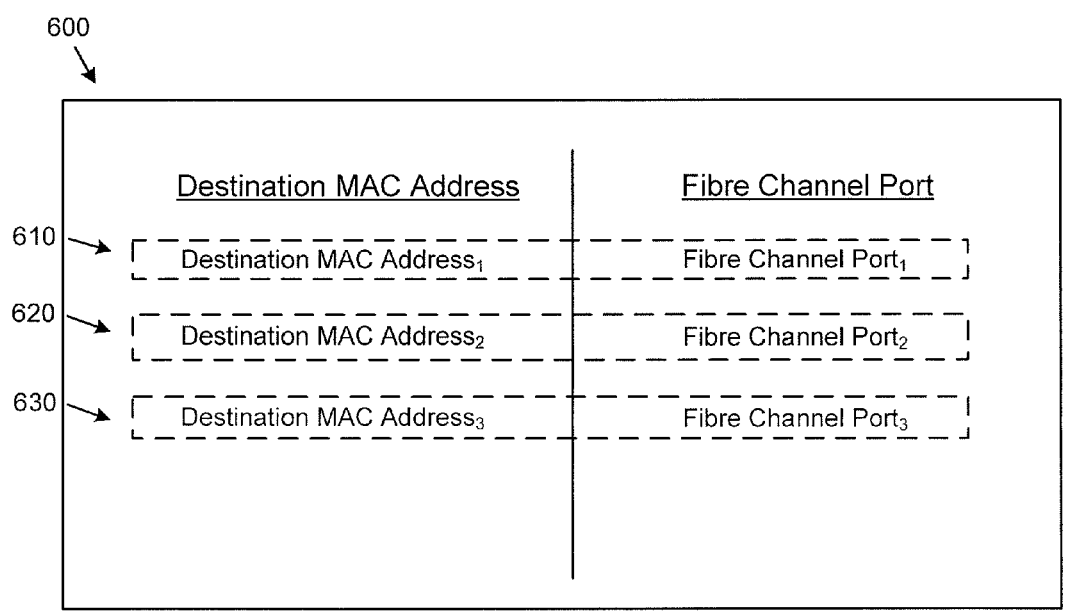
FIG. 6 is a schematic illustration of a table including a set of destination MAC addresses and associated Fibre Channel ports, according to another embodiment.

FIG. 6 is a schematic illustration of a table including a set of destination MAC addresses and associated Fibre Channel ports, according to another embodiment. More specifically, FIG. 6 illustrates a Table 600 including Records 610, 620 and 630.

The Table 600 can be any data table stored in hardware and/or software and defined for reference by a gateway device, such as the Gateway Device 110 discussed in connection with FIG. 1. In some embodiments, the Table 600 can be stored in a relational database operatively coupled to an FCoE gateway. In some embodiments, the Table 600 can be included in a policy module of a gateway device (e.g., the Switching Policy Module 141 discussed in connection with FIG. 1). The Table 600 can be referenced by the gateway device when receiving FCoE frames from one or more peripheral devices, and more particularly to enable the gateway device to identify a Fibre Channel port to which to send a received FCoE frame that includes a predetermined destination MAC address.

As shown in FIG. 6, the Table 600 includes Records 610, 620 and 630. Each of the Records 610, 620 and 630 includes a destination MAC address and a Fibre Channel port associated with that destination MAC address. In some embodiments, the gateway device and/or a switching module of the gateway device can reference one or more of the Records 610, 620 and 630 when forwarding a Fibre Channel frame from an FCoE frame to a Fibre Channel switch. For example, a switching module included in the gateway device can receive an FCoE frame with a destination MAC address that matches the Destination MAC Address$_1$ included in the Record 610. Based on a switching policy, guideline or rule, the gateway device can forward an FCoE frame and/or a Fibre Channel frame included in the FCoE frame to the Fibre Channel port associated with the Destination MAC Address$_1$. To identify the Fibre Channel port associated with the Destination MAC Address$_1$, the switching module can perform a lookup on the Table 600 based on the Destination MAC Address$_1$. Based on this lookup, the switching module can identify the Fibre Channel Port$_1$ included in the Record 610 and associated with the Destination MAC Address$_1$. The switching module can accordingly then send the FCoE frame and/or the Fibre Channel frame to the Fibre Channel Port$_1$ for transmission to a Fibre Channel switch. Although not shown in FIG. 6, in some embodiments each of the Records 610, 620 and 630 can include an identifier of a virtual local area network (VLAN) with which the Fibre Channel Port$_1$, the Fibre Channel Port$_2$ and the Fibre Channel Port$_3$, respectively, is associated.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described. For example, in some embodiments a gateway device and a peripheral processing device can be included in a single hardware device or module.

What is claimed is:

1. An apparatus, comprising:
    a switching policy module implemented in at least one of a memory or a processor, the switching policy module configured to define a switching policy associating a Fibre Channel port with a destination Media Access Control (MAC) address, the Fibre Channel port not being a virtual port; and
    a switching module implemented in at least one of a memory or a processor, the switching module configured to receive a Fibre Channel over Ethernet (FCoE) frame from a first network device, the FCoE frame including the destination MAC address, the switching module configured to drop the FCoE frame if the switching policy instructs the switching module to drop FCoE frames from a source MAC address associated with a second network device and if the FCoE frame includes the source MAC address associated with the second network device, the switching module configured to otherwise send, based at least in part on the switching policy and the destination MAC address, a Fibre Channel frame encapsulated in the FCoE frame to the Fibre Channel port such that the Fibre Channel frame is sent via the Fibre Channel port to a virtual Fibre Channel F port from a plurality of virtual Fibre Channel F ports.

2. The apparatus of claim 1, wherein the switching module is configured to identify the Fibre Channel port based at least in part on the destination MAC address.

3. The apparatus of claim 1, wherein the switching module is configured to send the Fibre Channel frame encapsulated in the FCoE frame to a Fibre Channel switch via the Fibre Channel port based at least in part on the destination MAC address being included in the FCoE frame.

4. The apparatus of claim 1, wherein the FCoE frame is a first FCoE frame, the Fibre Channel frame is a first Fibre Channel frame,
    the switching module configured to receive a second FCoE frame from a third network device, the second FCoE frame including the destination MAC address and a second Fibre Channel frame,
    the switching module configured to send the second Fibre Channel frame to the Fibre Channel port based at least in part on the switching policy and the destination MAC address.

5. The apparatus of claim 1, wherein the Fibre Channel port is a Fibre Channel N port configured to be operatively coupled to a Fibre Channel F port of a Fibre Channel switch, the virtual Fibre Channel F port being instantiated at the Fibre Channel F port of the Fibre Channel switch.

6. The apparatus of claim 1, wherein the FCoE frame is a first FCoE frame, the Fibre Channel frame is a first Fibre Channel frame, the destination MAC address is a first destination MAC address, the Fibre Channel port is a first Fibre Channel port and the switching policy is a first switching policy,
    the switching module configured to receive a second FCoE frame from a third network device, the second FCoE frame including a second destination MAC address and a second Fibre Channel frame,
    the switching module configured to identify a second Fibre Channel port associated with the second destination MAC address, the second Fibre Channel port not being a virtual port,
    the switching module configured to send the second Fibre Channel frame to the second Fibre Channel port based at least in part on a second switching policy associating the second destination MAC address and the second Fibre Channel port.

7. The apparatus of claim 1, further comprising a ternary content-addressable memory (TCAM) configured to store a filter, the TCAM being operatively coupled to the switching policy module and the switching module.

8. A system, comprising:
    a gateway configured to send and receive Fibre Channel data and Fibre Channel over Ethernet (FCoE) data, the gateway configured to be operatively coupled to a first network device, the gateway having a plurality of Fibre Channel ports configured to be operatively coupled to a Fibre Channel switch, the gateway configured to define a filter for transmission of data to the Fibre Channel switch via a Fibre Channel port from the plurality of Fibre Channel ports, the filter being defined based at least in part on a destination Media Access Control (MAC) address associated with the Fibre Channel port, the filter further configured to drop the FCoE data if a source MAC address included in the FCoE data is associated with a second network device,
    the gateway is configured to receive an FCoE frame from the first network device and send a Fibre Channel frame included in the FCoE frame to the Fibre Channel switch via the Fibre Channel port when (1) the FCoE frame satisfies the filter and (2) the FCoE frame includes the destination MAC address.

9. The system of claim 8, wherein the Fibre Channel switch is a multi-stage Fibre Channel switch fabric.

10. The system of claim 8 wherein the Fibre Channel switch and the gateway are included in a single physical device.

11. The system of claim 8, wherein each Fibre Channel port from the plurality of Fibre Channel ports is configured to be operatively coupled to a Fibre Channel port of the Fibre Channel switch and associated with at least one virtual Fibre Channel port from a plurality of virtual Fibre Channel ports instantiated at the Fibre Channel switch.

12. An apparatus, comprising:
a filter module implemented in at least one of a memory or a processor, the filter module configured to define a filter to be applied to a Fibre Channel over Ethernet (FCoE) frame received from a first network device, the filter being defined based at least in part on a first logical address associated with a Fibre Channel port from a plurality of Fibre Channel ports associated with the filter module, each Fibre Channel port from the plurality of Fibre Channel ports not being a virtual port,
the filter module configured to define the filter such that a Fibre Channel frame included in the FCoE frame is sent to the Fibre Channel port when a second logical address included in the FCoE frame matches the first logical address,
the filter module further configured to define the filter such that the FCoE frame is dropped if a source Media Access Control (MAC) address included in the FCoE frame is associated with a second network device,
the filter module configured to define the filter such that the Fibre Channel frame is not sent to any Fibre Channel port from the plurality of Fibre Channel ports when the second logical address included in the FCoE frame does not match any logical address associated with any Fibre Channel port from the plurality of Fibre Channel ports.

13. The apparatus of claim 12, wherein the first logical address is a MAC address associated with the Fibre Channel port; and
the second logical address is a destination MAC address included in the FCoE frame.

14. The apparatus of claim 12, wherein the Fibre Channel port is a Fibre Channel N port configured to be operatively coupled to a Fibre channel port of a Fibre Channel switch.

15. The apparatus of claim 12, wherein the Fibre Channel frame includes a destination identifier associated with a virtual Fibre Channel F port instantiated at a Fibre Channel switch, the destination identifier being a Fibre Channel Identifier (FCID),
the Fibre Channel frame includes a source identifier associated with a virtual Fibre Channel N port instantiated at the first network device, the source identifier being an FCID, and
the destination identifier and the source identifier define a virtual link associated with the virtual Fibre Channel F port and the virtual Fibre Channel N port.

16. The apparatus of claim 12, wherein the filter module is further configured to define the filter such that the FCoE frame is not dropped if the source MAC address included in the FCoE frame is associated with the first network device, and
wherein the filter module is configured to receive, from an initialization module, a signal including the source MAC address extracted from the FCoE frame, and wherein the source MAC address is associated with a virtual port instantiated at the first network device.

17. The apparatus of claim 12, wherein the filter module is included in a gateway, device, the gateway device configured to be operatively coupled to the first network device, the gateway device configured to be operatively coupled to a Fibre Channel switch via the plurality of Fibre Channel ports.

* * * * *